United States Patent

[11] 3,562,438

[72] Inventors Joseph J. Radomski
Shillington;
Paul B. Day, Kenhorst; Arthur H. Phillips,
Reading, Pa.

[21] Appl. No. 666,138
[22] Filed Sept. 7, 1967
[45] Patented Feb. 9, 1971
[73] Assignee Gai Tronics, Inc.
Reading, Pa.

[54] INTRAPLANT RADIO COMMUNICATION SYSTEM
4 Claims, 6 Drawing Figs.

[52] U.S. Cl. .......... 179/41, 340/311
[51] Int. Cl. .......... H04m 11/02
[50] Field of Search .......... 179/2 (RS), (RC), 2.5, 2.5R, 1.6, 1.8, 100.2 (REV) (Inquired), 41A, 28, 37, 40, 1 (FBS); 325/64 (Inquired); 340/311, 312, 171; 343/228

[56] References Cited
UNITED STATES PATENTS

| | | | |
|---|---|---|---|
| 3,080,454 | 3/1963 | Wenrich et al. | 179/37 |
| 3,476,884 | 11/1969 | Kajitani | 179/100.2 |
| 2,559,898 | 7/1951 | Plawczyk | 179/37 |
| 3,376,506 | 4/1968 | Sontag | 325/64 |
| 3,419,682 | 12/1968 | Thompson et al. | 179/1 |

*Primary Examiner*—Kathleen H. Claffy
*Assistant Examiner*—David L. Stewart
*Attorney*—William J. Ruano

ABSTRACT: This invention relates to an intraplant communication system which provides, in addition to telephone communication, radio channels of communication whereby communication may be had with roving watchmen or watchengineers who carry portable transceivers. The supplementary radio communication comprises a number of portable transceivers for communication with a base or fixed transmitter and receiver connected to the paging system. Such portable transceivers are equipped with a noise canceling low impedence type transmitter microphone and a separate earphone receiver.

INVENTORS
JOSEPH J. RADOMSKI
PAUL B. DAY
ARTHUR H. PHILLIPS
BY William J. Ruano
their ATTORNEY INVENTORS
JOSEPH J. RADOMSI
PAUL B. DAY
BY ARTHUR H. PHILLIPS
William J. Ruano
, their ATTORNEY

INTRAPLANT RADIO COMMUNICATION SYSTEM

BACKGROUND OF THE INVENTION

This invention relates to a radio communication system for use with, or in conjunction with the transistorized paging systems covered by U.S. Pat. No 3,080,454 and pending application Ser. No. 628,610 filed Apr. 5, 1967 assigned to the present assignee.

A disadvantage of said paging systems is that they include only telephone and loudspeaker systems and can reach only parties located at fixed stations.

An object of the present invention is to overcome the above-named disadvantage by enabling said paging systems to reach roving personnel, such as watchmen and watch-engineers carrying portable transceivers, also to enable such roving personnel to communicate via radio with others connected to said systems.

The present supplementary radio communication system used with the loudspeaker type paging system must work in most cases in close proximity with the output of these speakers. This condition would normally result in resonance and feedback, which would make it impossible to have satisfactory communication—therefore, would not be workable.

Another object of the present invention is to provide a novel communication system which is completely free of this difficulty and functions under all conditions within a building equipped with many loudspeakers, horns and handsets, as is the case with the basic communication system described in U.S. Patent No. 3,080,454.

A more specific object of the invention is to provide a novel communication system which consists of a number of portable radio transceivers for communication with base or fixed radio equipment which is connected to the paging system described in U.S. Pat No. 3,080,454. Conversation can then take place via both the radio and conventional paging system, allowing the use of the loudspeakers, or directly by radio from the same devices, that is, from any of the handset stations on the paging system to any portable transceiver which is in service.

Other objects and advantages of the invention will become more apparent from a study of the following description taken with the accompanying drawing wherein.

Figure 1:
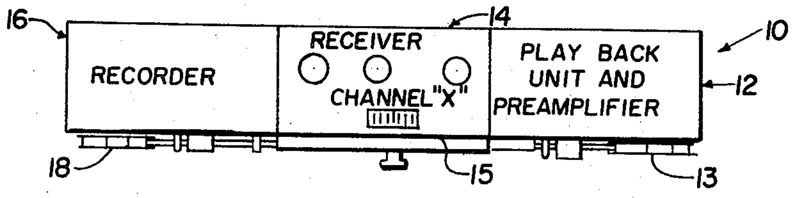
FIGS. 1 and 2 are top and elevation views of a basic unit comprising a recorder, receiver and play back unit and preamplifier embodying the present invention, with portions shown somewhat schematically.
Figure 2:
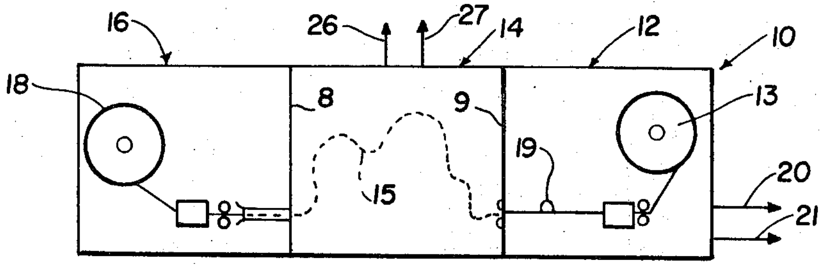

Referring more particularly to FIGS. 1 and 2 of the drawing, which shows a basic communication unit denoted by numeral 10, numeral 16 generally denotes a recorder, which includes a tape recorder spool 18 of any well known type from which tape 15, shown in dotted outline, is passed through a channel X receiver, denoted by numeral 14, having receiver terminals 26 and 27, thence passes through tension switch 19 and fed to spool 13 of a playback unit and preamplifier denoted generally by numeral 12.

Figures 3, 4:
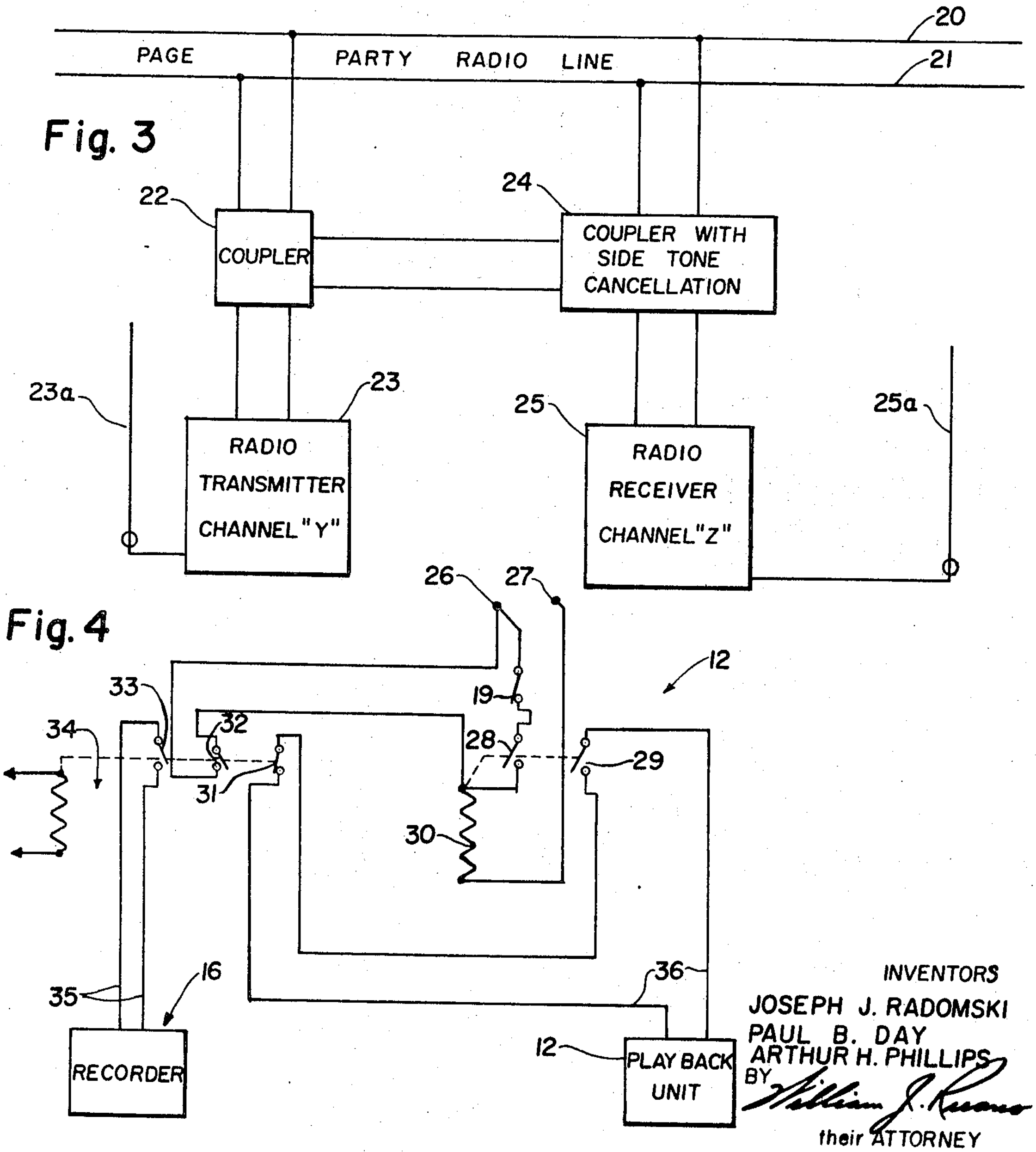
FIG. 3 is a circuit diagram showing the base or stationary radio communication system of the present invention.
FIG. 4 is a circuit diagram showing how the recorder unit and play back unit are controlled from a radio receiver channel X.

FIG. 3 shows the components of a party line 20, 21 which is used in addition to the page party lines shown in U.S. Pat. No. 3,080,454. A radio transmitter of channel Y 23 having an antenna 23A, is connected through coupler 22 to the line 20, 21 which coupler is connected coupler to coupler 24 having side tone cancellation, illustrated in block diagram and described in the aforesaid U.S. Pat. Nos. 2,831,922 and 3,080,454. Coupler 24 interconnects page party line 20, 21 to the radio receiver channel Z denoted by block diagram 25, including antenna 25A.

The portable radio transceivers are equipped with a noise canceling low impedance type tram transmitter microphone and a separate earphone receiver. These transceivers are transistorized crystal controlled with two or more available frequency channels, battery operated, in small compact units closely resembling the handset of a conventional telephone. They are also very light in weight and are readily worn and carried by a watchman, watch-engineer, or roving inspector.

The receiving section 14 of the base unit used to tie in the main paging system consists of a transistorized crystal controlled radio receiver with its own antenna and operating on X megacycles frequency.

Referring now to FIG. 4, the operating procedure consists of the initiated call from the portable unit. The carrier frequency of this portable unit (X megacycles) received by this base unit energizes the crystal controlled frequency sensitive relay 34, which, inturn, closes switch 33 to complete a circuit through line 35 which starts the tape recorder unit 16 and, at the same time, completes the circuit through switch 32 to control relay 30. Control relay 30 is then sealed in by its on own contact 28 in series with the contact 19 on the tape tension switch. Relay 30 also completes the circuit through switch 29 and conductors 36 for the tape playback unit 12 which will operate when the carrier is off and relay 34 opens.

During the period of "carrier on," the modulated message sent by the portable transceiver is recorded on tape 18 which folds itself at 15 between the two polished surfaces 8 and 9 of stainless steel or Lucite plastic in a fashion of storage. With the "carrier off," the playback will commence immediately sending the message over the paging system. When the message is completed, the tape will again become taut, operating the tape tension switch 19 and thus dropping out relay 30. The system is then ready for an answer over the paging system loudspeakers and the entire process is repeated to carry on conversation. In this mode, the portable transceiver operator receives his answer from the loudspeakers.

It will be noted that relay 34 has a short time delay on drop to override momentary breaking of the carrier output by the operator of the portable transceiver, also to allow the tape travel to be sufficient before the tension switch 19 resets the equipment.

Since the main paging system as shown in U.S. Pat. No. 3,080,454 has a selector switch at each handset station which allows the operators to select a private circuit for telephone conversation after the paging is completed, this same arrangement for eliminating the loudspeakers is also a feature for the present radio operation. In this mode, after the paging is completed the portable transceiver operator can request the party paged to select the "radio line." This party line then places the handset operator in direct connection with a base radio transmitter 23 operating on Y megacycles, and a separate base receiver 25 on Z megacycles. The portable transceiver operator then selects his Z transmit Y receive position and is in direct radio contact with the party on the paging handset station. Since all of this equipment is crystal controlled on all channels for both transmit and receive, there is no influence from one channel to another. For this reason, while there is a conversation on the "party radio line," a separate message could be transmitted from another portable transceiver into the main paging loudspeaker system.

From the foregoing description, it is evident that the supplemental radio features, with the means provided for satisfactory operation, readily become an integral part of the paging system and provide the necessary additional facilities for greater flexibility and utilization. In effect, the radio equipment not only supplements the basic paging system but, in the unique arrangement and design features, actually functions in a duplicate manner.

When using the page party radio line 20, 21 separate transmitter and receiver radio equipment are utilized. To circumvent the necessity for blocking the receiver on transmit, separate channels and separate spaced antennae 23A, 25A are employed.

Since audio output from the receiver could be simultaneously transmitted by the radio transmitter, special hybrid coupling devices 22 and 24 are used for signal cancellation from the receiver to the input of the transmitter. This coupling means, electronically unidirectional, utilizes modification of the side tone electrical cancellation as set forth in U.S. Pat. No. 2,831,922 and also U.S. Pat. No. 3,080,454.

The portable transceiver radio phones would, of course, be capable of direct conversation from one to another over an additional separate channel or over the Y—Z combination channel intended primarily for the page party radio line communication.

Another and very important feature of the present invention is the ability for the plant operators, engineers or other attendants to reach roving personnel, such as the roving watch-engineer, in the event he is beyond intelligible range of the speakers system. The roving portable transceiver operators, by keeping their equipment in the Y—Z mode, will receive sufficient audible notification when they are called from the paging system via the page party radio line. This mode of operation permits communication in the area immediately outside of the plant building or a similar circumstance not normally covered by the paging system described in U.S. Pat. No. 3,080,454.

In a modification of the invention it is contemplated to utilize only one receiver. To accomplish this, relaying is necessary in connection with the energizing of the page party radio line which relaying transfers the radio receiver from the tape to the coupler 24 now connected to receiver channel Z. The channel X receiver 14 would then not be required. When use of the page party radio line is completed, the relays restore the radio receiver to the tape recorder for normal service. This relaying is specifically described for the reason that it is well known to the art to use ANOX and other auxiliary relays to accomplish changes or modifications of this kind.

Figure 5:
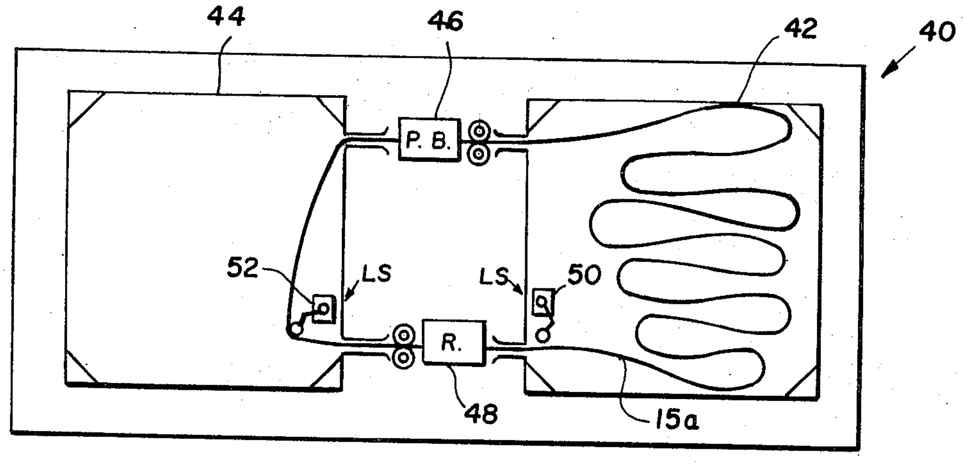
FIGS. 5 and 6 are top and elevation views of a modification of the invention.
Figure 6:
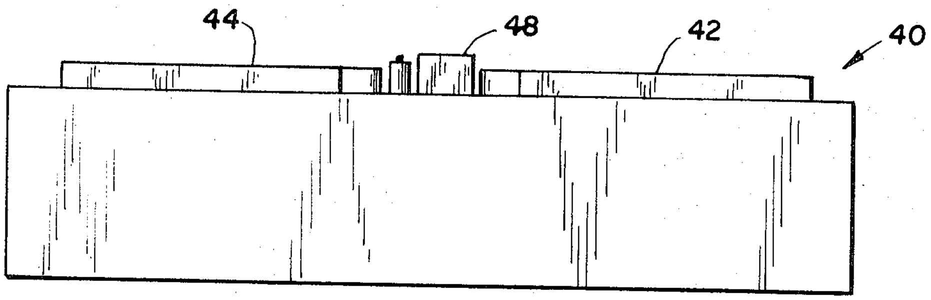

FIGS. 5 and 6 show a modification of the tape operation and design which can be utilized if a record of conversations is not required, as would be possible when using long run spools. The modification 40 consists of a continuous tape 15*a* (no spools) which folds into separate stainless steel or Lucite compartments 42, 44. The tape allows about three (3) minutes of message, which is normally a great deal more than required. In average conversation, each transmission can be measured in seconds before an answer is required.

In this modification, the two drives, one record R and on playback P.B. are located between the tape folding compartments 42, 44. One compartment 44 receives the recorded tape. From this compartment the tape is taken through the playback head 46 and deposited in the other compartment 42 in a manner of storage. Both compartments have tape tension switches 50 and 52 to stop the recorder 48 or playback drives when all the tape is paid out in any direction. The tape tension switch operation on playback is the "end of message" point of operation. On this continuous tape arrangement, the limit switch LS 50 is in the storage compartment supplying the recording drive is merely a precautionary 46 measure, for actually no conversational requirement for three minutes of tape is ever anticipated. However, without this limit a relay failure could cause the tape to tear from excessive tension of from ward wear on the tape drive at the time of tension and slippage.

Thus it will be seen that we have provided an efficient supplemental circuit to the intraplant voice communication system described in U.S. Pat. No. 3,080,454 to enable paging and communication via radio with roving personnel, such as engineer watchmen who carry portable radio transceivers, which supplemental circuit eliminates feedback and cancels side tone.

While we have described several embodiments of our invention, it will be understood that these are by way of illustration only, and that various changes and modifications may be made within the contemplation of our invention and within the scope of the following claims.

We claim:

1. In an intraplant voice communication system comprising a plurality of separate stations, each including a loudspeaker and associated power amplifier and power supply therefor and including a handset having a receiver, microphone and preamplifier, and a party line and page line to which said power amplifier and preamplifier are connected; the improvement comprising a page party radio line, a radio transmitter connected thereto, a radio receiver also connected thereto for providing communication between a separate transceiver and said radio receiver and intraplant voice communication system, a tape recorder which is initiated by the carrier frequency of said transceiver, and a playback unit connected to said page party radio line and which starts when said carrier frequency is turned off so that the playback message will be sent over the paging system.

2. An intraplant voice communication system as recited in claim 1, together with a storage container for receiving tape from said tape recorder and located between said recorder and playback unit, and an electrical switch responsive to the tension of said tape for controlling operation of said playback unit.

3. an intraplant voice communication system as recited in claim 1 wherein said radio transmitter is operable at a given frequency and is connected to said page party radio line through a coupler, and wherein said radio receiver is operable at a different frequency and is connected to said page party radio line through a second coupler with side tone cancellation.

4. An intraplant voice communication system as recited in claim 1 together with a storage container including two separate compartments for receiving the entire length of tape, one of said compartments serving as a storage container for a large length of tape folded back and forth therein, and a tape tension switch located in at least one of said compartments.